(12) United States Patent
Long et al.

(10) Patent No.: US 6,344,144 B1
(45) Date of Patent: Feb. 5, 2002

(54) HIGH-CAPACITY BIO-BLOCK AERATION SYSTEM FOR STIMULATING ENHANCED BIO-ACTIVITY IN AEROBIC WASTEWATER TREATMENT PROCESSES

(75) Inventors: David Long, Fairport; Klaus E. T. Siebert, Pittsford, both of NY (US)

(73) Assignee: FBC Technologies, Inc., Pittsford, NY (US)

(*) Notice: Subject to any disclaimer, the term of this patent is extended or adjusted under 35 U.S.C. 154(b) by 0 days.

(21) Appl. No.: 09/568,073

(22) Filed: May 10, 2000

(51) Int. Cl.[7] .............................. C02F 3/02; C02F 1/74
(52) U.S. Cl. ..................... 210/620; 210/747; 210/170; 210/221.2; 210/232; 210/242.2; 261/DIG. 70
(58) Field of Search ................................. 210/620, 629, 210/747, 150, 170, 198.1, 220, 221.1, 221.2, 232, 242.1, 242.2; 261/121.1, 124, 126, DIG. 70

(56) References Cited

U.S. PATENT DOCUMENTS

| | | | |
|---|---|---|---|
| 3,033,372 A | * 5/1962 | Riddick | |
| 3,490,752 A | 1/1970 | Danjes et al. | 261/122 |
| 3,664,647 A | 5/1972 | Snow | 261/30 |
| 3,704,009 A | * 11/1972 | Kalbskopf | |
| 3,757,950 A | 9/1973 | Zebley | 210/123 |
| 3,837,492 A | 9/1974 | DiBello | 210/150 |
| 3,984,323 A | 10/1976 | Evens | 210/220 |
| 4,028,244 A | * 6/1977 | Holmberg | |
| 4,072,612 A | 2/1978 | Daniel | 210/169 |
| 4,165,281 A | 8/1979 | Kuriyama et al. | 210/17 |
| 4,215,082 A | 7/1980 | Danel | 261/124 |
| 4,287,060 A | 9/1981 | Coggins | 210/194 |
| 4,308,137 A | 12/1981 | Freeman | 210/194 |
| 4,670,149 A | 6/1987 | Francis | 210/608 |
| 4,680,111 A | 7/1987 | Ueda | 210/150 |
| 4,906,359 A | 3/1990 | Cox, Jr. | 210/170 |
| 5,096,579 A | 3/1992 | Jordan et al. | 210/194 |
| 5,228,998 A | 7/1993 | DiClemente et al. | 210/610 |
| 5,316,671 A | * 5/1994 | Murphy | |
| 5,374,353 A | * 12/1994 | Murphy | |
| 5,468,392 A | 11/1995 | Hanson et al. | 210/615 |
| 5,500,112 A | 3/1996 | McDonald | 210/151 |
| 5,507,950 A | 4/1996 | Senda et al. | 210/615 |
| 5,688,400 A | 11/1997 | Baxter, Sr. | 210/195.3 |
| 5,772,887 A | 6/1998 | Noah et al. | 210/617 |

FOREIGN PATENT DOCUMENTS

FR    1377571    9/1964

* cited by examiner

Primary Examiner—David A. Simmons
Assistant Examiner—Fred Prince
(74) Attorney, Agent, or Firm—Eugene Stephens & Associates

(57) ABSTRACT

This invention relates to the aeration of relatively large volumes of wastewater using an improved high-capacity aeration system to stimulate enhanced bio-activity. An air delivery system is provided to deliver oxygen to a body of wastewater beneath a large main processing float and a plurality of smaller bio-block floats positioned in proximity to the large main float to sustain biological media submerged beneath the floats. The bio-block floats are positioned relative to the main float so that the treatment capacity of the system can be increased without using additional, more costly, large processing floats. Moreover, the bio-block floats are made smaller relative to the main float so that the system can be easily and inexpensively transported using readily available standard-sized trucks.

22 Claims, 3 Drawing Sheets

HIGH-CAPACITY BIO-BLOCK AERATION SYSTEM FOR STIMULATING ENHANCED BIO-ACTIVITY IN AEROBIC WASTEWATER TREATMENT PROCESSES

TECHNICAL FIELD

High-capacity aerobic wastewater treatment systems for treating relatively large volumes of organic waste.

BACKGROUND OF THE INVENTION

Many wastewater treatment systems use colonies of cultivated strains of microorganisms to decompose organic wastes. For instance, in U.S. Pat. Nos. 4,670,149 (Francis) and 4,680,111 (Ueda), bacterial incubators are floated or suspended near, or just below, the surface of the water being treated. Because the colonies used to treat wastewater require oxygen, it is necessary to aerate or oxygenate the wastewater being treated to sustain the colonies. Moreover, because many industrial sites have large bodies of wastewater (e.g., ponds, lagoons, etc.), there is a need for economical aeration systems that can effectively oxygenate large volumes of wastewater.

Conventional aeration systems can include a wide variety of devices designed to increase dissolved oxygen content in water. Wastewater treatment engineers have discovered that aeration devices that produce very fine bubbles are particularly well-suited for oxygenating wastewater. Examples of such devices are disclosed in U.S. Pat. Nos. 3,490,752 (Danjes et al.), 3,664,647 (Snow), and 4,215,082 (Danel). Other well-known aeration devices designed for use in larger bodies of water aerate wastewater by agitation. These devices use paddle-wheels, pumps, and water jets. For example, U.S. Pat. No. 4,072,612 (Daniel) discloses a large mixing pump, while U.S. Pat. No. 3,984,323 (Evens) and French Patent No. 1,377,571 disclose water-jet mixers.

Although these systems can effectively oxygenate relatively small volumes of wastewater, because several conventional processing units may be needed to facilitate the treatment of large volumes of waste, it is often too costly for industries to use conventional systems to oxygenate large volumes of wastewater. In addition, since multiple conventional processing units are often used to treat large volumes of wastewater, transportation can be cumbersome and expensive. Large volumes of wastewater are particularly common at food processing plants, pulp and paper facilities, chemical and textile companies, and municipal wastewater treatment plants. Because of the expense associated with oxygenating large volumes of water using multiple conventional aeration systems, there is a need for more economical, high-capacity aeration systems.

SUMMARY OF THE INVENTION

We have developed an improved, lower cost, high-capacity wastewater aeration system to stimulate enhanced bio-activity for the treatment of relatively large volumes of wastewater. Our system includes three main components: a large main processing float, a plurality of smaller "bio-block" processing floats, and an air delivery system to deliver oxygen to the wastewater being treated. The air delivery system delivers oxygen to the wastewater beneath the large main processing float and beneath each smaller bio-block float so that biological media submerged beneath the floats are sustained.

By positioning a plurality of smaller bio-block floats in proximity to the large main processing float, we can treat a significantly larger volume of wastewater than we could using a single, large main processing float. Moreover, by using a plurality of smaller bio-block floats instead of multiple large processing floats to increase the system's aerobic treatment capacity, we can increase treatment capacity and enhance bio-activity more cost-effectively. In addition, the smaller bio-block floats also make transportation of the system less cumbersome and less costly. Our improved wastewater aeration system offers increased treatment capacity and high mobility and provides facilities that generate relatively large volumes of organic waste as an economic alternative to more costly conventional aeration systems.

DETAILED DESCRIPTION

We have developed an improved, lower cost, high-capacity wastewater aeration system that can stimulate enhanced bio-activity to effectively treat relatively large volumes of organic waste.

Generally, the system includes three main components: a large main processing float, a plurality of smaller bio-block processing floats, and an air delivery system. The system is arranged so that the air delivery system can deliver oxygen to the wastewater beneath the large main float and beneath each bio-block float so that biological media submerged beneath each float are sustained during treatment. Moreover, although many different air delivery systems can be used in conjunction with our system, we prefer to use an air compressor with attached conduits to deliver the oxygen into the wastewater.

By arranging the smaller bio-block floats in proximity to the large main processing float, we can cost-effectively increase the system's aerobic treatment capacity and stimulate enhanced bio-activity without using additional, more costly, large processing floats. In addition to inexpensively increasing treatment capacity and stimulating enhanced bio-activity, the smaller bio-block floats also make the system easier to transport than a system comprised of multiple large processing floats. For instance, by sizing the bio-block floats so that they are significantly smaller than the larger main processing float, we can transport the entire system using readily available, standard-sized trucks.

Our system can be arranged in various configurations to suit the waste management needs of a particular client. For instance, in one embodiment of the system 10 (depicted in FIG. 1), the air delivery system 1 is positioned on shore and delivers oxygen 7 to the system 10 through a conduit 2. Because the air delivery system 1 may periodically require servicing, some clients may find it more convenient to have the system 1 located on shore. Moreover, since some clients may already have a shore-based air delivery system, they may be able to adapt our system 10 to operate in conjunction with their existing air delivery system, thereby saving them the cost of purchasing additional air delivery equipment.

Figure 1:
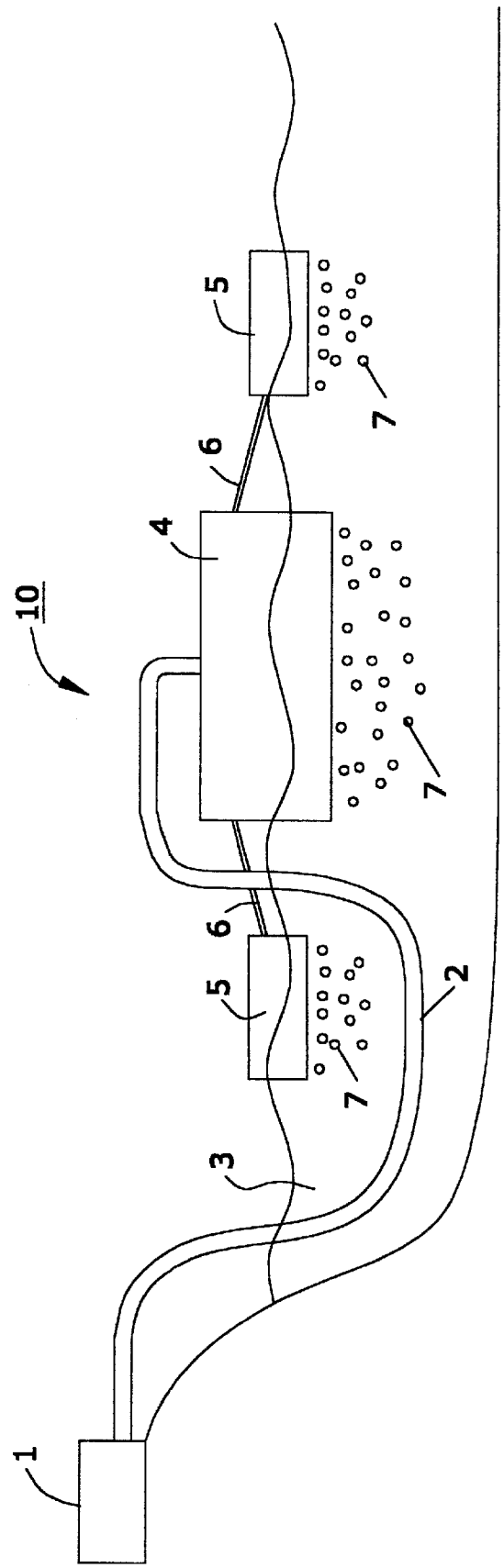
FIG. 1 is a schematic view of one embodiment of the oxygenation system wherein the air delivery system is located on shore.

In the embodiment of FIG. 1, the conduit 2 is attached to the main processing float 4. Oxygen 7 is delivered to the wastewater 3 beneath the main float 4 and each smaller bio-block float 5 to sustain biological media submerged beneath the floats 4, 5. To maintain proper spacing between the main float 4 and the smaller bio-block floats 5, we prefer to moor the bio-block floats 5 to the main float 4. In the embodiment of FIG. 1, the bio-block floats 5 are moored to the main float 4 with rigid members 6 so that the bio-block floats 5 remain at a fixed distance from the main float 4. By keeping the bio-blocks 5 at a fixed distance from the main float 4, we can ensure that the system 10 covers an appropriate area to facilitate efficient aerobic treatment. Although the bio-block floats 5 depicted in FIG. 1 are moored to the main float 4 with rigid members 6, the bio-blocks 5 can also be moored to the main float 4 using rope, chain, cable, and other alternative mooring means.

Figure 2:
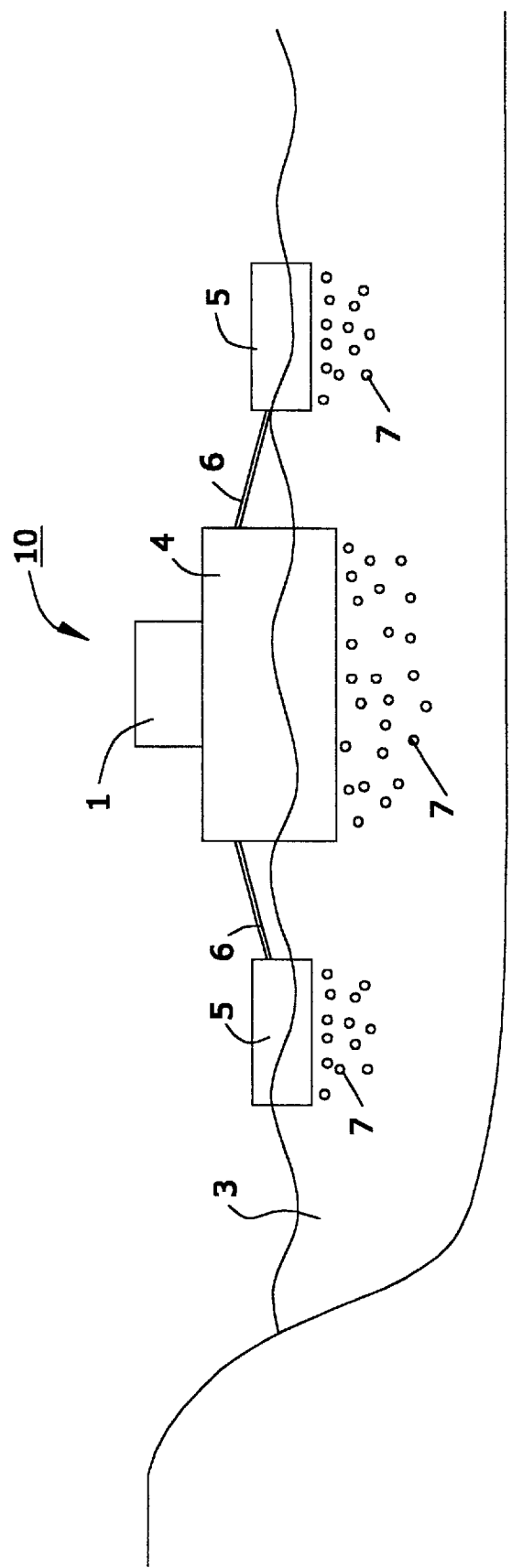
FIG. 2 is a schematic view of one embodiment of the oxygenation system wherein the air delivery system is located on the main processing float.

An alternative arrangement of our system 10 is depicted in FIG. 2. Unlike the system 10 of FIG. 1 wherein the air delivery system 1 is positioned on shore, the system 10 of FIG. 2 has the air delivery system 1 positioned upon the main float 4. In this arrangement, the system 10 is entirely self-contained. The air delivery system 1 is self-powered and delivers oxygen 7 to the wastewater 3 beneath the main float 4 and the bio-block floats 5 to sustain biological media submerged beneath the floats 4, 5. Again, the bio-blocks 5 can be moored to the main float 4 using rigid members 6 or other alternative mooring means.

Figure 3:
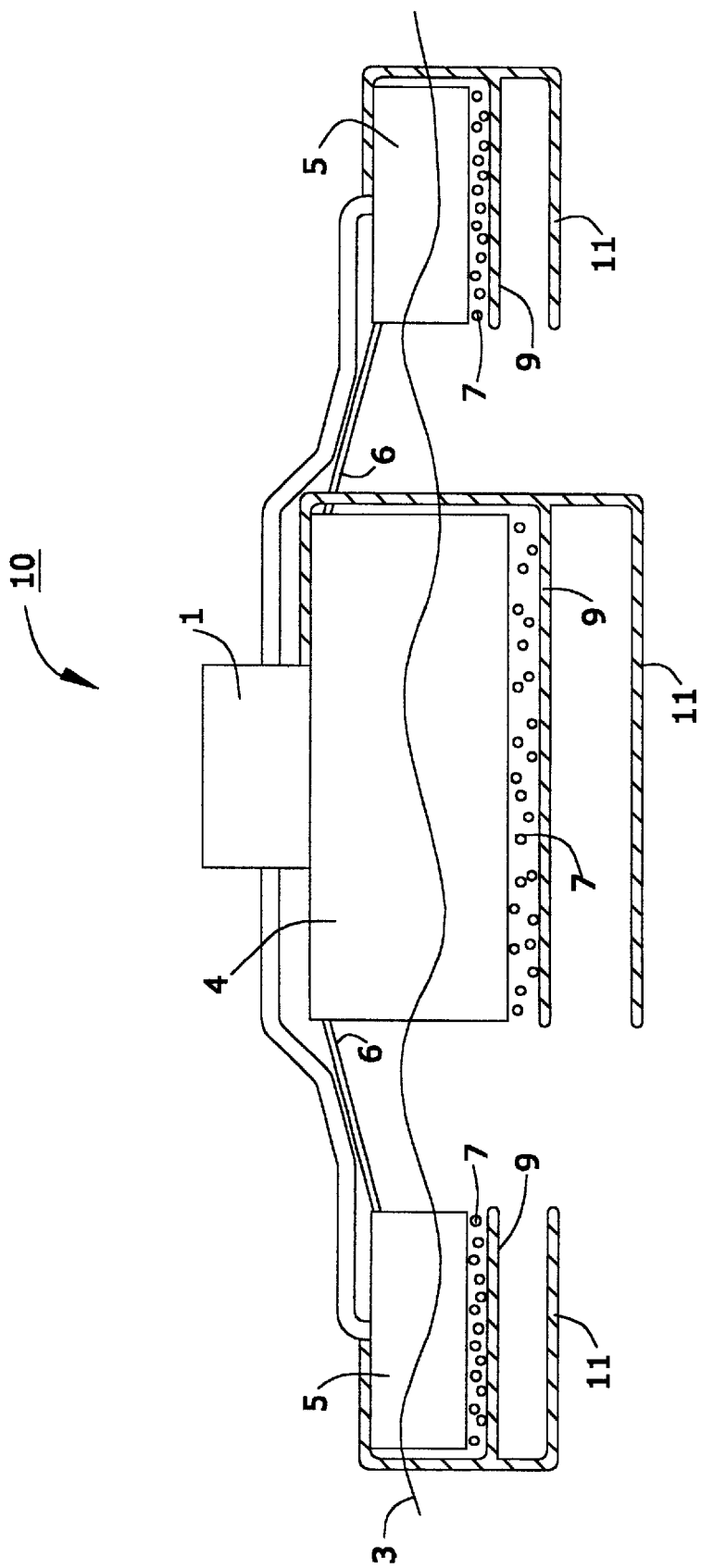
FIG. 3 is a schematic view of one embodiment of the system wherein oxygen is delivered to the wastewater beneath the main float and beneath each bio-block float using diffusers.

Regardless of the system's specific arrangement, it is important to select an air delivery system that can provide adequate oxygen to the wastewater being treated. Moreover, it also important to deliver the oxygen to the wastewater so that the bio-media beneath each float are not disrupted. Because oxygen has a tendency to rise quickly in water, we prefer to deliver the oxygen into the water in the form of fine bubbles. By making the bubbles fine, the oxygen tends to remain suspended in the wastewater for a longer period of time before rising to the surface. Furthermore, we find that fine bubbles are less disruptive to the bio-media than larger, more coarse bubbles. While there are many ways to produce and deliver fine oxygen bubbles into the wastewater, we prefer to use resin membrane diffusers positioned beneath each float. By making the membranes large enough, we can ensure that a sufficient amount of oxygen reaches the bio-media beneath the floats without having to spend an inordinate amount of time accurately aligning the floats above the membranes. By pumping air from the air delivery system 1 through membrane diffusers 9 positioned beneath each float 4, 5, we can provide an adequate supply of oxygen 7 to sustain the biomedia submerged beneath the floats 4, 5 (see FIG. 3).

In addition to delivering fine oxygen bubbles to sustain the bio-media beneath each float, we also prefer to include a means for producing coarse bubbles beneath each float. Although coarse bubbles are too disruptive for normal oxygenation purposes, they are useful for periodically unclogging the bio-media region beneath the floats. When sufficiently oxygenated for extended periods of time, the bio-media beneath a particular float may proliferate to such an extent that they clog the bio-media region and reduce the aerobic treatment capacity of the system by hindering aeration. When this occurs, it is beneficial to deliver coarse bubbles to unclog the bio-media region to restore aerobic treatment capacity. While there are several ways to deliver coarse bubbles to the bio-media region beneath the floats, we have found that perforated, coarse bubble manifolds 11 are one suitable way for delivering coarse bubbles (see FIG. 3).

An additional advantage of our system is that clients can cost-effectively increase the system's aerobic treatment capacity to handle small increases in waste production. For instance, if a client experiences a slight increase in the demand for its product, requiring an increase in production to meet the heightened demand, the client can simply add additional bio-block floats to increase the system's treatment capacity. Because bio-block floats are easier to transport and are far less expensive than larger, conventional processing floats, they provide a convenient and economical means for increasing system treatment capacity to handle relatively small waste production increases. Although significant increases in waste production may require the client to purchase additional main processing floats as well as additional air delivery equipment, by adding bio-block floats, the client can temporarily increase treatment capacity to handle relatively minor waste production increases and can thereby delay the expense of purchasing additional equipment until the volume of waste being generated becomes more significant.

Our improved wastewater aeration system offers consumers a system that can effectively and inexpensively treat relatively large volumes of wastewater. In addition, because aerobic treatment capacity is increased using small bio-block floats instead of a plurality of larger conventional processing floats, our system is also easier to transport. Finally, because our system offers these advantages to consumers at a reasonable cost, our system is an attractive alternative to more costly, conventional aeration systems.

We claim:

1. A system aerating wastewater and stimulating bio-activity to enhance performance of aerobic wastewater treatment processes, the system comprising:
   a. a plurality of smaller floats positioned in proximity to a larger main float in a body of wastewater, wherein each smaller float includes submerged biological media for aerobic wastewater treatment;
   b. an air delivery system positioned to deliver oxygen to the wastewater to sustain biological media submerged beneath the main float; and
   c. a plurality of conduits, positioned to deliver oxygen from the air delivery system to each smaller float to oxygenate the wastewater in which the biological media of each smaller float are submerged.

2. The system of claim 1, wherein each smaller float is moored to the main float so that the system can effectively oxygenate a larger area of wastewater than the system could if the main float were operated by itself without any surrounding smaller floats.

3. The system of claim 1, wherein the air delivery system is positioned on the main float.

4. The system of claim 1, wherein the air delivery system is positioned on shore.

5. The system of claim 1, wherein the air delivery system is an air compressor.

6. The system of claim 1, wherein the smaller floats are smaller than the main float and small enough so that the smaller floats can be conveniently transported using a single standard-sized truck.

7. The system of claim 1, wherein the air delivery system oxygenates the wastewater beneath the main float and each smaller float by introducing air bubbles into the water beneath the main float and each smaller float.

8. A method of oxygenating wastewater and stimulating bio-activity to enhance performance of aerobic wastewater treatment processes, the method comprising the steps of:
   a. positioning a plurality of smaller floats in proximity to a larger main float in a body of wastewater, wherein each smaller float includes submerged biological media to promote aerobic treatment of the wastewater;

b. introducing oxygen into the wastewater beneath the main float so that the biological media submerged beneath the main float are sustained; and c. delivering oxygen to the water under the smaller floats so that the biological media submerged beneath each smaller float are sustained and aerobic treatment capacity is enhanced.

9. The method of claim 8, including introducing oxygen into the wastewater beneath the main float and each smaller float around the main float using an air delivery system.

10. The method of claim 9, including positioning the air delivery system on the main float.

11. The method of claim 9, including positioning the air delivery system on shore.

12. The method of claim 9, including using an air compressor as the air delivery system.

13. The method of claim 9, including connecting a plurality of conduits to the air delivery system so that oxygen from the air delivery system can be delivered through a conduit to the wastewater beneath each smaller float.

14. The method of claim 8, including mooring the smaller floats to the main float so that a larger area of wastewater can be treated than if the main float were operated without any nearby smaller floats.

15. The method of claim 8, including constructing the smaller floats so that the plurality of smaller floats can be conveniently transported using a single standard-sized truck.

16. A high-capacity wastewater oxygenation system enhancing bio-activity in aerobic wastewater treatment processes, the system comprising:

a. a large main float placed in a body of wastewater so that biological media submerged beneath the main float facilitate aerobic wastewater treatment;

b. a plurality of smaller floats positioned in proximity to the larger main float, wherein each smaller float includes submerged biological media to aerobically treat the wastewater; and c. an air delivery system that delivers oxygen to the wastewater beneath the main float and the smaller floats to sustain the biological media submerged under each float.

17. The system of claim 16, including a plurality of conduits attached to the air delivery system and positioned to deliver oxygen to the wastewater beneath each smaller float.

18. The system of claim 16, wherein each smaller float is smaller than the main float and small enough so that the plurality of smaller floats can be conveniently transported using a single standard-sized truck.

19. The system of claim 16, wherein the air delivery system is an air compressor.

20. The system of claim 16, wherein the air delivery system includes a plurality of conduits that deliver oxygen bubbles beneath the surface of the wastewater.

21. The system of claim 16, wherein the air delivery system is positioned on the main float.

22. The system of claim 16, wherein the air delivery system is positioned on shore.

\* \* \* \* \*